United States Patent [19]
Malot et al.

[11] Patent Number: 6,159,279
[45] Date of Patent: Dec. 12, 2000

[54] RECYCLED ROADWAY MATERIAL MILLINGS BASED ASPHALT-FINES MATRIX, PROCEDURE FOR RECYCLING THESE MATERIALS AND USE OF THE COATED MATERIAL

[75] Inventors: Michel Malot, Bolbec; Yannick Jolivet, Le Havre, both of France

[73] Assignee: Total Raffinage Distribution S.A., Puteaux, France

[21] Appl. No.: 09/314,131

[22] Filed: May 19, 1999

[30] Foreign Application Priority Data

May 20, 1998 [FR] France ..................... 98 06358

[51] Int. Cl.⁷ .................................... C09D 195/00
[52] U.S. Cl. ..................... 106/284.01; 106/281.1
[58] Field of Search ............... 106/281.1, 284.01

[56] References Cited

U.S. PATENT DOCUMENTS

| | | | |
|---|---|---|---|
| 5,759,250 | 6/1998 | Malot et al. | 106/281.1 |
| 5,766,333 | 6/1998 | Lukens | 106/280 |

*Primary Examiner*—David Brunsman
*Attorney, Agent, or Firm*—Sughrue, Mion, Zinn, Macpeak & Seas, PLLC

[57] ABSTRACT

An asphalt-fines matrix contains a quantity of millings that ranges between 1 and 70% of the total weight of the incorporated mineral material, mixed with a heavy grade bituminous binder, and has a stiffness modulus $E^*$, measured at 15° C. and at 10 Hz, that ranges between $9.10^3$ and $15.10^3$ MPa.

14 Claims, No Drawings

6,159,279

RECYCLED ROADWAY MATERIAL MILLINGS BASED ASPHALT-FINES MATRIX, PROCEDURE FOR RECYCLING THESE MATERIALS AND USE OF THE COATED MATERIAL

BACKGROUND OF THE INVENTION

This invention relates to the recycling of roadway materials such as old surfacing, made up of aggregates coated with a bituminous binder, in the form of bituminous millings, and reused as asphalt-fines matrices in the paving industry.

Ordinarily, bituminous pavements are composite constructions consisting of aggregates coated with a bituminous binder, over a layer of a few centimeters. However, after a certain length of time, these surfacings undergo an aging caused by the constraints generated by traffic and weather conditions, which causes a hardening of the binder, the apparition of stress cracks and/or the phenomenon of rutting.

One must therefore plan for treatment of the road in order to remedy these degradations.

With this in mind, various recycling procedures have been implemented, using, among others, techniques that consist in milling the existing surfacing with a machine in order to obtain a material called "milling", that is then mixed with a regeneration bituminous binder according to a hot or cold process.

The conventional recycling of roadway materials, which has been the object of many works for several years, calls for a wide range of techniques adapted in particular to asphalt-fines matrices. These various procedures, developed by paving companies and now well mastered, use specific equipment for the recycling in plant or remixing in situ, and for bituminous materials, where the principal that is used is based on the notion of regeneration of the bitumen present in the layer to be treated and on the correction of the granulometric curve per supply of new aggregates and possibly of fines.

Concerning the bituminous binder, the objective is to regenerate the old bitumen, whose hardening is a result of the volatilization of its lighter parts, by correcting its chemical composition using a customized binder in order to obtain a final binder with the characteristics of a traditional bitumen. With this in mind, the oil companies are marketing recycling binders with an aromatic characteristic and low asphaltene contents.

These procedures use hot or cold techniques.

In particular, such a cold regeneration procedure is described in patent EP-0 286 531, that teaches the use of a regeneration binder consisting of a bitumen with a high penetrability and a high content in aromatic compounds, this binder contains approximately 10% of an essentially aromatic solvent, whose characteristics and implementation content are determined based on the characteristics of the aged coated material, in particular the nature of the aggregates, and the content and characteristics of the initial binder.

Furthermore, we also know, through European patent application EP-0 810 276, that we can use a procedure of bitumen recycling that consists in disintegrating old asphalt into particles smaller than 5 mm, and separating these particles into at least two fractions and heating them separately, before mixing them with new bitumen, for example in the form of an emulsion.

More recent developments have tried to partially resolve these problems by using on site cold reprocessed millings, either with cement, or by associating cement and bitumen emulsion, without however in some cases, obtaining a significant stiffness modulus.

This is the case in particular in German patent application DE-3 729 507, that relates to a procedure for recycling road bitumen by mixing aggregates obtained by disintegration of the surface layer with an aqueous bitumen emulsion in which is incorporated between 1 and 5% by weight of a hydraulic binder such as cement, in order to improve the mechanical resistance of the material.

Nevertheless, these procedures do not make it possible to eliminate the major technical constraint, which is the need to have homogenous millings, both from the granulometric and composition point of view and as far are the characteristics of aging binders are concerned, whose regeneration must be reached by mixing it with a new binder.

But this is a significant handicap for the management of the collection, sorting and storing of materials to be recycled that greatly reduces the economic interest of these traditional recycling procedures and has limited the development of recycling in France.

SUMMARY OF THE INVENTION

This invention intends to propose a procedure that would make it possible to eliminate the afore-mentioned drawbacks.

Surprisingly, this invention proposes to abandon the notion of regenerating the old bitumen contained in the millings and to consider the latter as simple aggregates to be stabilized by mixing them with a hard grade bituminous binder.

With this in mind, the first object of this invention is an asphalt-fines matrix with a base of recycled roadway material millings, characterized by the fact that it contains a quantity of millings ranging between 1 and 70% by total weight of the incorporated mineral material, mixed with a hard grade bituminous binder, and by the fact that is has a stiffness modulus E*, measured at 15° C. and at 10 Hz, ranging between $9.10^3$ and $15.10^3$ MPa.

These values place the performance level of this coated material above that of the bitumen gravel (abbreviated GB), as defined by the standard NF P 98-138 (E* ⊒ $9.10^3$ MPa) and more or less at a level close to that of a high modulus coated material (abbreviated, EME), as defined according to the standard NF P 98-140 (E* ⊒ $14.10^3$ MPa).

According to an advantageous mode of realization, the coated material contains approximately 70% by weight of millings, in relation to the total weight of the mineral material.

Preferably, the hard grade bituminous binder has a penetrability at 25° C. that ranges between 10 and 30 tenths of a mm, and the hard grade bituminous binder ranges between 2.5 and 6% by weight, in relation to the total weight of the incorporated mineral material.

Furthermore, this coated material has a rutting depth of less than 5 mm at 30,000 cycles and at 60° C. (test according to the standard NF P 98-253-1) and an RSP compaction at 100 rotations greater than 95% (compaction test with a RSP rotation sheer press, according to the standard NF P 98-252) as well as an alternate flexural fatigue behavior at 10° C. and 25 Hz, that is translated by a relative distortion value $\epsilon_6$ greater than or equal to $110.10^{-6}$ (test according to the standard NF P 98-261-1).

A second object of the invention relates to a procedure for recycling as asphalt-fines matrix, roadway materials in the form of bituminous millings, in the paving industry, by mixing millings and new aggregates, which is characterized by the fact that the incorporation of the millings represents from 1 to 70% by total weight of the mineral material and by the fact that the coating of this mixture is carried out by a hard grade bituminous binder, with a penetrability at 25° C. that ranges between 10 and 30 tenths of a mm.

The procedure as set forth in the invention makes it possible to obtain a matrix with a visco-elastic behavior thanks to the coating of millings by a hard bitumen, thus ensuring the bonding of the new material so obtained, without any regeneration of the aging binder.

A significant advantage of the procedure as set forth in the invention is therefore to be able to recycle types of millings that are not homogenous, from various sources, without the need to sort them first.

Advantageously, the content of hard grade bituminous binder ranges between 2.5 and 6% by weight in relation to the total weight of the mineral material. More particularly, the content in hard grade bituminous binder may be 3.5% by weight.

According to one particularly advantageous characteristic of the invention, the overall content in binder ranges between 5 and 10% by weight in relation to the total weight of the mineral material.

In a preferred implementation form of the procedure as set forth in the invention, this procedure first allows for the crushing and screening of the millings, in order to obtain a 0/10 or 0/14 granulometry (where 98% of the particles pass through a sieve with a 10 or 14 mm mesh), and the supplying of new aggregates at a minimum rate of 30% by weight of the total mineral material, to create a granulometric curve of the high modulus coated material type (EME) as defined by the standard NF P 98-140.

In addition, the coating step is carried out at a temperature of at least 180° C., with a mixing time that is greater by approximately 30% than that of a traditional coating.

Preferably, the bituminous millings have an aging binder content of at least 3% by weight, in relation to the aggregates.

Another object of the invention relates to the use of the asphalt-fines matrix described above or obtained by the procedure described above, in the paving industry, for the realization of roadway base coats or binder courses.

The tests related here-after, whose character is not limitative, were carried out in a laboratory using mixtures of millings, new aggregates and hard bitumen, by way of hot coating, and using their mechanical evaluation compared with a traditional high modulus coated material (EME), and with a bitumen gravel, and they are intended to illustrate the implementation of the invention and its advantages.

DETAILED DESCRIPTION OF THE PREFERRED EMBODIMENTS

EXAMPLE 1

Formulation of a coated material E, as set forth in the invention

The bituminous millings used for the tests have a 0/14 granulometry (where 98% of the particles pass through a sieve with a 14 mm mesh) and a binder content, with a penetrability at 25° C. of 20 1/10 mm, of 4.1% by weight.

In order to obtain a bituminous material that is compatible with a paving use, meaning resistant to rutting, to mechanical fatigue and to thermal cycles, the following composition by weight was chosen:

| | |
|---|---|
| millings | 70% |
| aggregates: 0/10 Meilleraie type | 30% |
| binder: Viatotal 10/20 bitumen (product by TOTAL; penetrability at 25° C., of between 10 and 20 1/10 mm) | 3.5 ppc (parts per percent of weight) |

The mixture is prepared in a mixer at a temperature of 180° C. after heating the millings at this temperature.

A first compaction test using a rotation sheer press (RSP), carried out according to the NF P 98-252 standard, provided a packing density of 98.5% at 100 rotations, whereas, for a Class 2 high modulus coated material (EME), as defined according to the NP P 98-140 standard, this rate must be greater than or equal to 94%, and for a Class 3 bitumen gravel (GB), as defined by the NF P 98-138 standard and with a 0/14 granulometry, the rate must be greater than or equal to 90%. This result shows a good capacity of resistance to fatigue of the coated material as set forth in the invention.

A rutting test, according to standard NF P 98-253-1, carried out at 60° C. and at 30,000 cycles, gives an average rutting value of 0.9% in relation to the thickness of the test cylinder (10 cm), or 0.9 mm, whereas this value must be less than or equal to 8% for a high modulus coated material (EME) and usually ranges between 4 and 5%, and must be less than and equal to 10% for a bitumen gravel (GB). This indicates a good behavior when hot of the coated material as set forth in the invention.

A comparative evaluation of the mechanical performances with a traditional high modulus coated material (EME) as well as with a bitumen gravel (GB) was carried out by completing:

resistance to compression and indirect traction tests, according to the theory of Mohr-Coulomb, tests to measure the stiffness modulus, according to the TOTAL internal method 762/95, tests to determine the fatigue strength, according to the NF P 98-261-1 standard.

A) Compression Resistance and Indirect Traction Tests

Based on the range of compression and traction and the shape of their envelope, the theory of Mohr-Coulomb applied to the granular materials makes it possible to obtain information on the type of fracture, the bonding, the fragility and the resistance to sheering.

If R is the resistance to compression and r is the resistance to the indirect traction, according to this theory and the geometric analysis of the ranges, it is known that:

the bonding $C=\frac{1}{2}(Rr)^{0.5}$.

the angle of internal friction $\phi$ is defined by the relation Sin $\phi=R-R/k+r$ (when $\phi=\pi/2$, this translates into a purely elastic behavior of the material, and when $\phi=0$, a purely viscous behavior).

the resistance to sheering $\sigma=R.r/R+r$.

Comparative tests between the coated material as set forth in the invention (E1), whose composition was described above, and a coating called EME, with a 0/14 granularity, of the type defined by the standard NF 98-140 and containing the same content (3.5 ppc) of Viatotal 10/20 binder, were carried out in Buriez testing cylinders at 18° C. The results obtained, which are compiled in the following Table, show characteristics that are very similar, in particular concerning the bonding and resistance to sheering, which is an indication, for the coated material as set forth in the invention, of performances of resistance to the action-effect of road traffic at average and low temperatures, that are at least equivalent to those of an EME.

TABLE

| Reference | Compaction (%) | R (MPa) | R (MPa) | φ (°) | Bonding (MPa) | σ (MPa) |
|---|---|---|---|---|---|---|
| E1 | 97.3 | 16.3 | 2.4 | 48 | 3.1 | 2.09 |
| EME | 96 | 11.4 | 2.7 | 48 | 3.1 | 2.18 |

B) Measurement of the dynamic stiffness modulus

We use a TOTAL internal testing method 762/95 of traction-compression with an imposed distortion in a cylindrical testing cylinder subjected to a sinusoidal load (using an Instron device), to determine the value of the dynamic modulus E*, emanating from the complex modulus E*.

At a temperature of 15° C. and a frequency of 10 Hz, the stiffness modulus E* is of 12,500 MPa, a value ranging between that of a GB whose E* is greater than or equal to 9,000 MPa, and that of an EME, whose E* is greater than or equal to 14,000 MPa.

The value of the dynamic modulus is used in the dimensioning calculation of roadways, and, the higher it is, the more the thickness of the roadway can be reduced.

We can thus evaluate that the gain of thickness, for a base layer of the road created with the coated material as set forth in the invention, in relation to a Class 3 bitumen gravel (GB), ranges between 10 and 40%.

C) Evaluation of the fatigue resistance

The method used, as set forth in the standard NF P 98-261-1, is based of the action-effect by constant deflection sinusoidal bending of trapezoidal test cylinders. Each test cylinder is loaded by a wavetrain of continuous sine waves with a given amplitude until a traditional fracture is reached. Several deflection amplitudes are necessary to determine the slope of the fatigue line, which is established from results representing the life N (or number of cycles) for the levels of distortion as chosen, by creating a linear regression of type $\ln N = A_0 + A_1 \cdot \ln \epsilon$, where ln designates the napierian logarithm that makes it possible to calculate the value of the relative distortion that on average corresponds to $10^6$ cycles of loading, $\epsilon_6$. The higher the value, the more the product resists to fatigue.

For tests carried out at a temperature of 10° C. and a frequency of 25 Hz, $\epsilon_6 = 142 \cdot 10^{-6}$ whereas for an EME and a GB, this value must respectively be greater than or equal to $130 \cdot 10^{-6}$ and greater than or equal to $110 \cdot 10^{-6}$.

EXAMPLE 2

A second formulation of coated materials as set forth in the invention with the following composition by weight was tested:

millings: 30% aggregates (0/10, Meilleraie type): 70% binder: Viatotal 10/20 bitumen, 4.0 ppc (parts per percent in weight)

Measurement of the stiffness dynamic modulus (according to the TOTAL method 762/95), at a temperature of 15° C. and a frequency of 10 Hz, provides a value of 13,940 MPa, a value whose range remains between that of a bitumen gravel and that of an EME (between $9 \cdot 10^3$ and $15 \cdot 10^3$ MPa).

These values clearly show that the asphalt-fines matrix as set forth in the invention has a much improved fatigue behavior compared to that of a GB and even slightly superior to that of an EME.

In conclusion, in view of the results of tests carried out on the coated material as set forth in the invention, incorporating bituminous millings, the performances of this material makes it possible to use it in a satisfactory manner in base layers of roadways and/or in binder courses, while reducing the constraints of the traditional recycling and therefore favoring the recycling in considerable quantities of bituminous millings.

We can also consider extending this recycling project to other paving waste, in particular to materials that are treated with hydraulic binders, such as cements or coarse aggregate concrete.

What is claimed is:

1. A recycled roadway milling based asphalt-fines matrix, wherein a quantity of millings ranging between 1 and 70% of the total weight of the incorporated mineral material, mixed with a hard grade bituminous binder, and which has a stiffness modulus E*, measured at 15° C. and at 10 Hz, that ranges between $9 \times 10^3$ and $15 \times 10^3$ MPa.

2. An asphalt-fines matrix as set forth in claim 1, which contains approximately 70% by weight of millings, in relation to the total weight of the incorporated mineral material.

3. An asphalt-fines matrix as set forth in claim 1, wherein hard grade bituminous binder has a penetrability at 25° C. that ranges between 10 and 30 tenths of a mm.

4. An asphalt-fines matrix as set forth in claim 3, wherein the hard grade bituminous binder content ranges between 2.5 and 6% by weight, in relation to the total weight of the incorporated mineral material.

5. An asphalt-fines matrix as set forth in claim 1, which has a rutting depth that is less than 5 mm, measured at 30,000 cycles and at 60° C., according to the standard NF P 98-253-1, and an RSP compaction at 100 rotations that is greater than 95% according to the standard NF P 98-252.

6. An asphalt-fines matrix as set forth in claim 1, which has an alternate flexural fatigue behavior at 10° C. and at 25 Hz, that is translated by a relative distortion value $\epsilon_6$ that is greater than or equal to $110 \times 10^{-6}$.

7. An asphalt-fines matrix as set forth in claim 1, which contains between approximately 30 and 70% by weight of millings, in relation to the overall weight of the incorporated mineral material.

8. A recycling procedure as asphalt-fines matrix, in the paving industry, of roadway materials in the form of bituminous millings, by mixing millings and new aggregates, wherein the incorporation of millings represents from 1 to 70% of the total weight of the mineral material, and the coating of this mixture is reached using a hard grade bituminous binder, with a penetrability at 25° C. ranging between 10 and 30 tenths of a mm.

9. A procedure as set forth in claim 8, wherein the hard grade bituminous binder content ranges between 2.5 and 6% by weight, in relation to the total weight of the mineral material.

10. A procedure as set forth in claim 8, wherein the hard grade bituminous binder content is 3.5% by weight.

11. A procedure as set forth in claim 8, wherein the overall binder content ranges between 5 and 10% by weight, in relation to the total weight of the mineral material.

12. A procedure as set forth in claim 8, comprising a preliminary step of crushing and sieving the millings in order to obtain a 0/10 or 0/14 granulometry, and a step of supplying new aggregates at a minimum rate of 30% by weight of the total mineral material in order to create a granulometric curve of the high modulus coated material type.

13. A procedure as set forth in claim 8, wherein the coating step is carried out at a temperature of at least 180° C. with a mixing time that is greater by approximately 30% than that of a traditional coating.

14. A procedure as set forth in claim 8, wherein the bituminous millings have a content in aging binder of at least 3% by weight in relation to the aggregates.

* * * * *